Nov. 27, 1951      A. E. PETERSON      2,576,356
FOLDING VEHICLE FOR BABIES
Filed Sept. 5, 1947      4 Sheets-Sheet 1
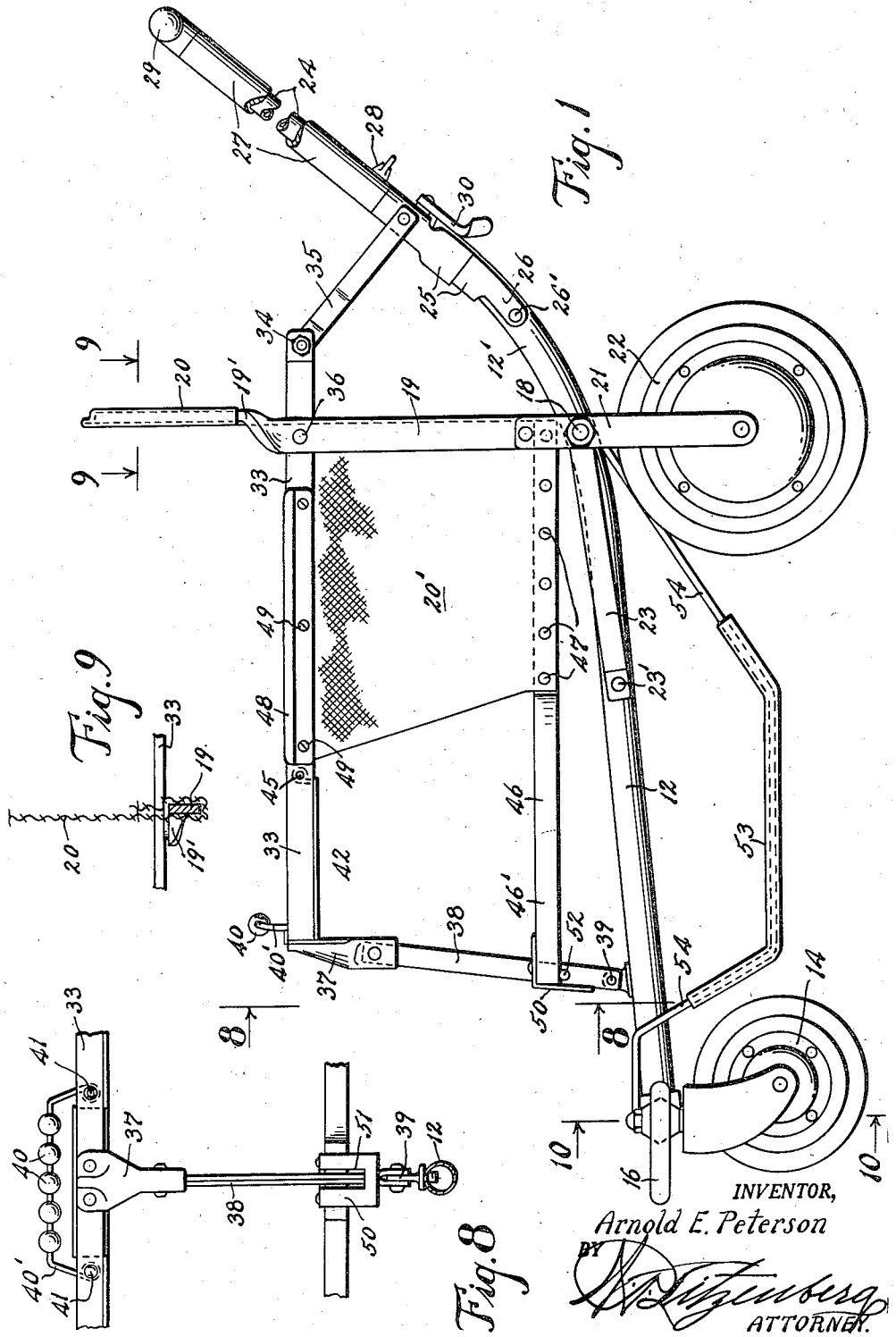
INVENTOR,
Arnold E. Peterson
BY
ATTORNEY.

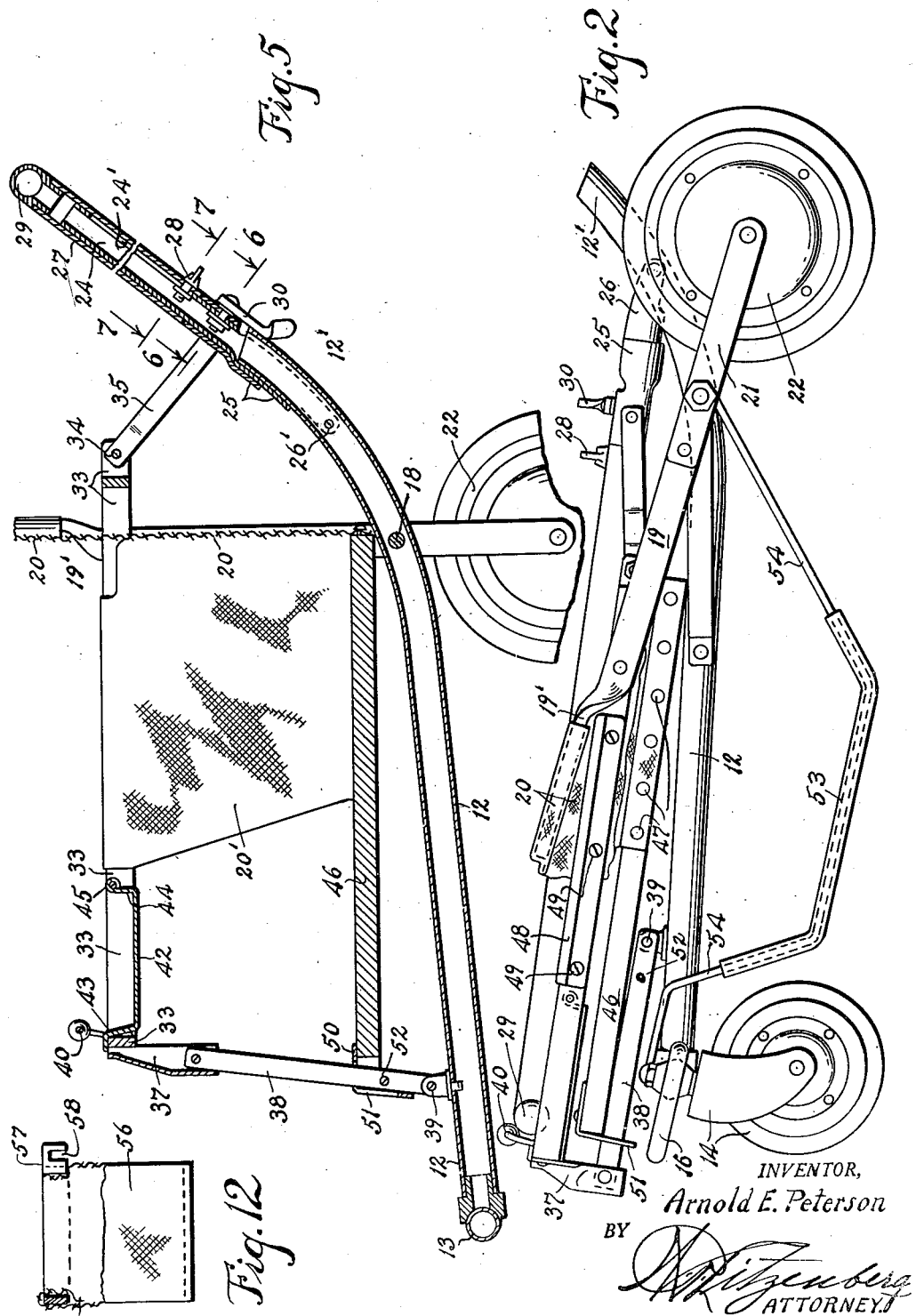

Nov. 27, 1951 A. E. PETERSON 2,576,356
FOLDING VEHICLE FOR BABIES
Filed Sept. 5, 1947 4 Sheets-Sheet 3
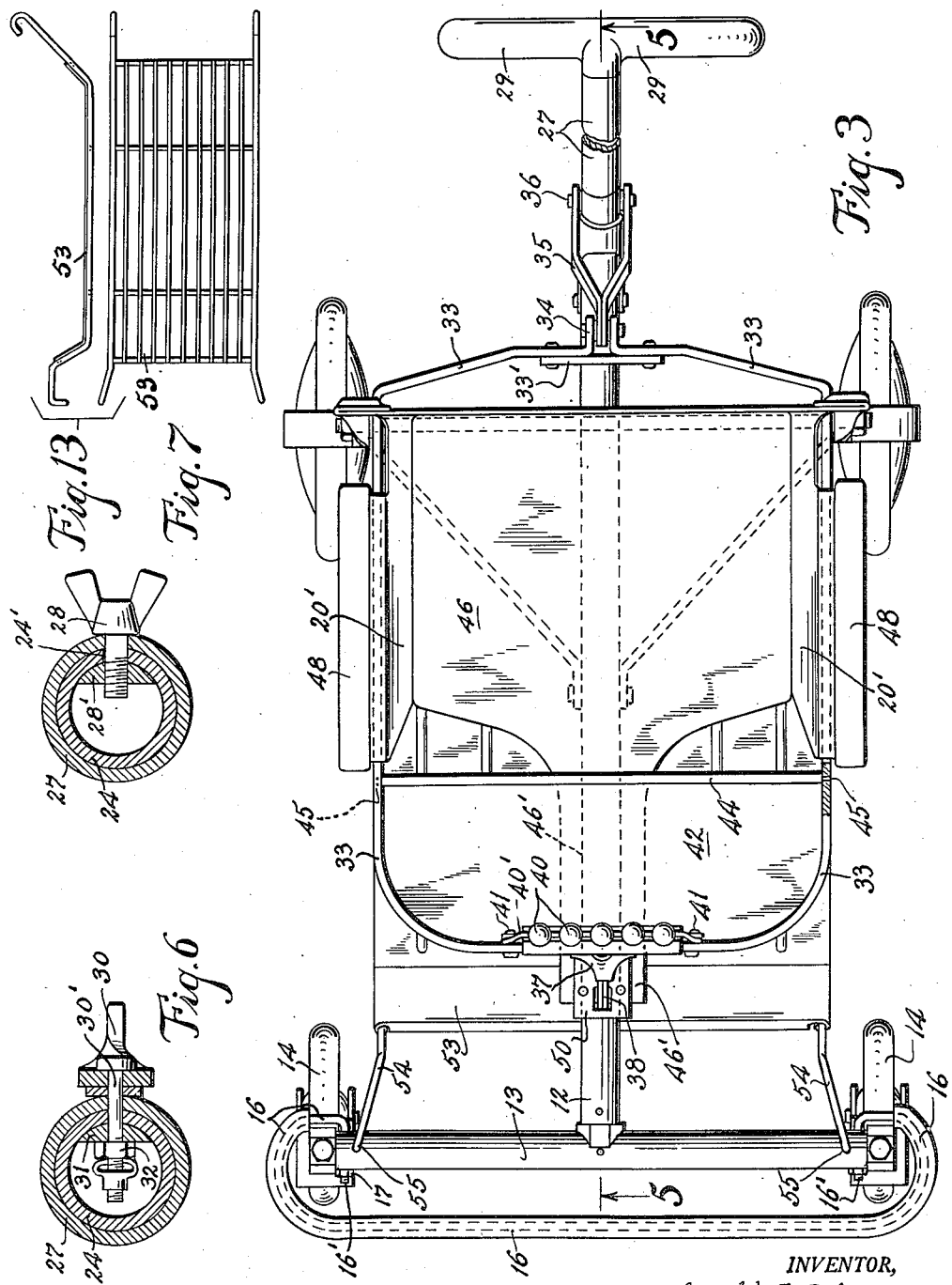
INVENTOR,
Arnold E. Peterson
BY
ATTORNEY.

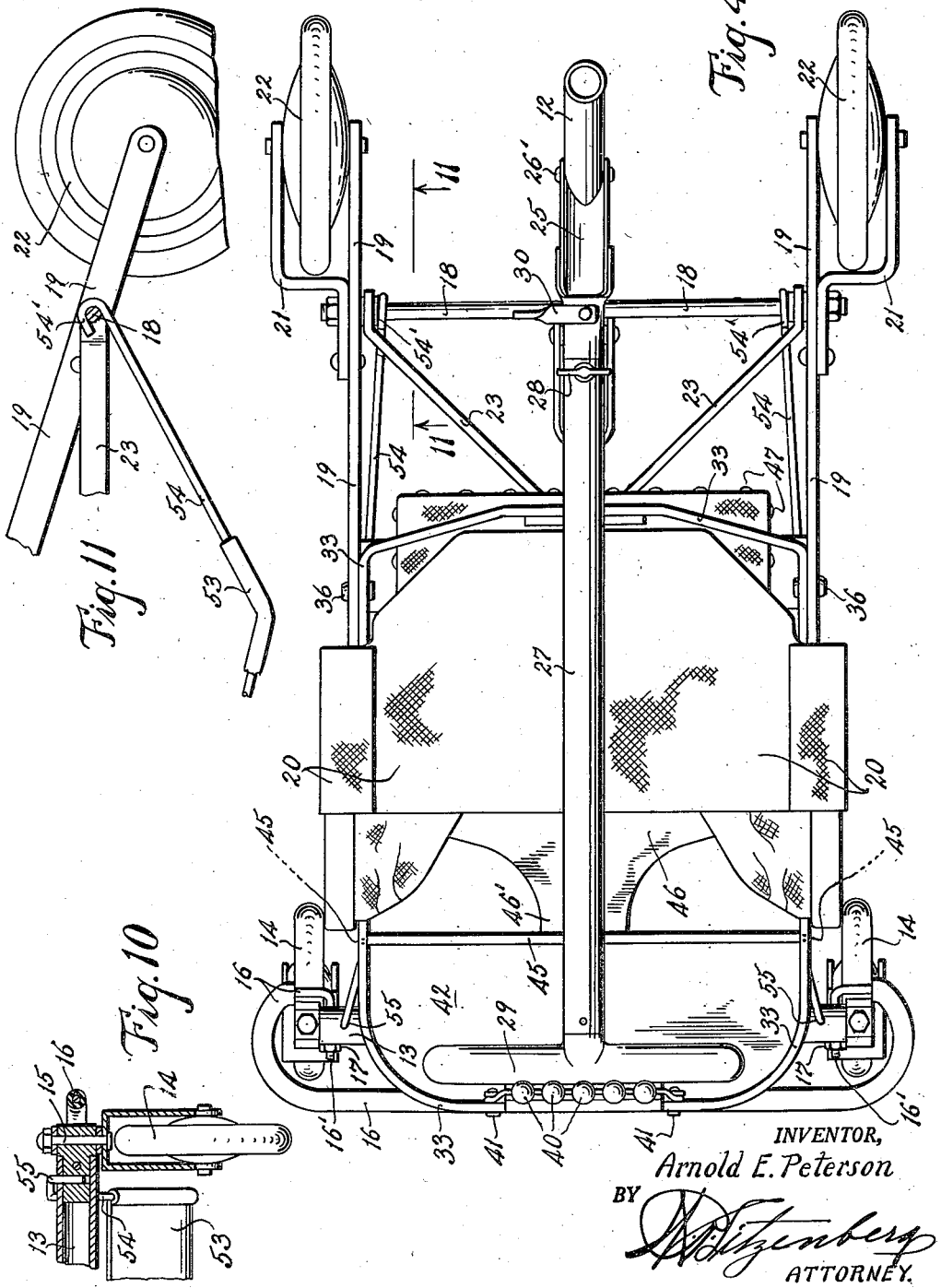

Patented Nov. 27, 1951

2,576,356

UNITED STATES PATENT OFFICE 2,576,356

FOLDING VEHICLE FOR BABIES

Arnold E. Peterson, Glendale, Calif.

Application September 5, 1947, Serial No. 772,312

5 Claims. (Cl. 155—22)

This invention relates to folding vehicles for babies, and includes further improvements in my invention in Letters Patent No. 2,314,659, of March 23, 1943.

Among the salient objects of the present invention are: To improve the foldability and utility of the vehicle, and to add thereto additional features which will make for more convenience and safety;

To provide structural features which will increase its usefulness, which features are detachable, and which also make it possible to convert the vehicle into a walker for the child using it;

To provide improvements which make for lightness, simplicity, practicability and attractiveness.

I have shown the improved invention on the accompanying four sheets of drawings which I will now describe.

Figure 1 is a side elevation of a vehicle embodying my invention;

Figure 2 is a side view showing the vehicle folded together;

Figure 3 is a plan view looking down into the open vehicle;

Figure 4 is a plan view looking down upon the folded vehicle;

Figure 5 is a longitudinal sectional view through the vehicle, taken on the line 5—5 of Fig. 3;

Figures 6 and 7 are sectional views taken on lines 6—6 and 7—7 of Fig. 5, showing locking means for adjustable features;

Figure 8 is a fragmentary front view as seen on line 8—8 of Fig. 1;

Figure 9 is a detailed sectional view taken on line 9—9, Fig. 1;

Figure 10 is a fragmentary sectional view taken on line 10—10, Fig. 1;

Figure 11 is a fragmentary view taken on line 11—11, Fig. 4;

Figure 12 is a detail showing a detachable carrying box or container for packages made to fit a part of the frame of the vehicle; and Figure 13 shows a modified form of floor member as a grill.

Referring in detail to the drawings, the frame structure is preferably made of tubular members, with flat metal brace and connecting members, substantially as shown. A central body member 12, shown of tubular material, is provided at its front end with a tubular T-member 13, provided at its opposite ends with two caster wheels 14, 14, connected thereto in the manner illustrated in sectional view in Fig. 10, said caster wheels each having a pivot stem, as 15, on which it swivels freely, as will be understood from the construction clearly illustrated. A bumper-like member 16 is extended in front of said T-member 13, and at its ends it is curved around the opposite ends of said member 13, and is inserted at its ends therethrough, as at 16', 16' and secured with nuts, as 17. Said bumper member is preferably covered with a rubber tube for protection.

Through the rearward end of said tubular body member 12, is a connecting shaft 18, having at its opposite ends vertical side members 19, 19, having their upper ends twisted a half turn to form holders for the opposite ends of a fabric seat back 20, as seen at 19', Fig. 1. Said side members have off-set branch members, as 21, which form therewith forks for holding the rear wheels, 22, 22, as illustrated clearly in Fig. 4. Angle brace members 23, 23, from the outer ends of the connecting shaft 18 are secured at their forward ends to the central body member 12, as at 23'.

The rearward end of said central body member 12 is upturned, as at 12', and has pivotally connected with it an extension member 24, of tubular form, the connecting member 25 being of semi-tubular form, with its opposite sides extended as pivot arms 26, and pivotally connected with the tubular member 12, as at 26'. Said extension 24 is provided with a longitudinally extending slot 24' with a tubular handle member 27 telescoping thereover, and having a winged nut tightening means at 28 for securing said handle tube in adjusted position. Said handle member 27 is provided at its upper end with a T-handle 29, as shown in Fig. 3. Said tightening means 28 includes an inner tube-fitting nut element 28', as seen clearly in Fig. 7. Also mounted on the connecting member 25, near the juncture of the upturned end 12' of the member 12 and said connecting member 25, is a pivoted lock lever 30, adapted to be swung down to overlap the end 12' of said member 12, for locking said hinged members against folding. Said pivoted lever is shown in detail in Fig. 6, in section, and its pivot bolt 30' extends through the telescoping members 24 and 27, and screws into a special nut element 31, with a nut lock 32 therein. By turning said lever 30 to one side, said handle extension can be folded over, together with all the other parts connected therewith.

Extending between and connecting the upper portions of the vertical side members is a substantially square body or frame member 33, having its two ends brought together and bolted, as at 34, with a splicing or connecting member 33', as shown, and with a connecting link 35 pivotally connecting it with the handle coupling member 25, as seen in Figs. 1 and 3. Said frame 33 is pivotally connected at its rearward end to said vertical side members 19, 19, as at 36, 36, and at its forward end it is connected with a link 38 by means of a rigid connecting member 37, which link is pivotally connected also to the tubular member 12, as at 39, for folding purposes.

On the front end of said frame member 33 is a string of beads 40, on a wire, both ends of which are secured to said frame 33, as at 41, 41. It will be noted that the T-handle 29 can be sprung under said string of beads, as seen in Fig. 4, and is thus held in place, but can be pulled therefrom with a little pull on the hande. This holds the handle in folded condition until released.

Fitted in the forward part of said square frame member 33, and detachable therefrom is a pan 42, having a struck up bend portion 43 in front and adapted to hook over the front of said frame 33, under the beads 40, Fig. 5, and at its rearward side having a back wall 44, with short end studs 45 projecting therefrom to be inserted through holes in the opposite sides of said frame 33, as shown, and adapted, when said side members are expanded by hand, to come out to permit said pan to be removed for washing or to give clearance in the front of said frame for the baby to walk, as again referred to.

A seat board 46, having a reduced or narrow front end 46' is secured to the lower end of the fabric seat back, designated 20, Fig. 5, said fabric being extended at both sides, as at 20', 20', to form wing portions and secured to the edge of said seat board, as shown at 47, Fig. 1. At the upper edges of said wing portions 20', at opposite sides, said fabric is looped over the frame member 33, and is secured in place by means of arm rest members 48, 48, on the outer sides thereof with small removable screws 49, 49.

On the reduced end of said seat board 46' is an angle piece 50, having a slot 51 therein, through which the supporting link 38 passes, Fig. 8. A through pin 52, in said link 38 serves as a support for the narrow front end of said seat board, as seen in Fig. 1. Thus the end of said seat board can move up on said connecting link 38 as said vehicle is folded in the manner clearly shown in Fig. 2.

A removable foot pan or floor member 53 is shown, having two side wires or rods 54, 54, with hooks at 54', 54', to hook over the cross rod 18, as seen in Fig. 4, and at its front end the opposite ends of said side rods 54, 54 are bent downwardly so as to be inserted into holes in the front T-member 13, as seen at 55, 55, whereby said pan or floor can be removed when it is desired to permit the child to walk on the floor, by straddling the narrow front end of the seat board 46. Said floor member 53 is preferably made of wire as a grill.

In order to fold said vehicle from the position shown in Fig. 1 to the position shown in Fig. 2, it is only necessary to turn the lock lever 30 to one side, and press the handle extension 27 forwardly and downwardly and all parts—vertical side members 19, frame 33, seat 46, link 38, will all move forwardly and downwardly into the collapsed condition, as seen in Fig. 2. The T-member 29 on the handle is pressed past the row of beads and is held thereby until pulled out. The folded vehicle can be easily picked up by the side member or by the bumper 16 and easily carried, for it is very light and compact, the weight being only eight pounds.

The frame member 33 is made of flat metal, as shown, and constitutes a strong and convenient supporting means for a special carrying bag or holder 56, Fig. 12, having a pair of rearwardly projecting ends, as 57, with downwardly opening slots 58, adapted to be pressed down over said frame 33, at opposite sides of the bead wire 40', as will be understood from Fig. 5, taken in connection with Fig. 12, that is: the slots 58 will fit over the member 33, and will be held firmly because of the rectangular form fit thereof. This will place the carrying holder 56 over the front end of the central member 12 and its T-member 13, in the angle area in front of the supporting link 38.

Thus I have provided important improvements over my former Folding Baby Push Cart shown in the patent first herein referred to, and while I have shown a practical embodiment of said invention and the improvements, as now manufactured and distributed, I do not limit the invention to the details of construction and arrangement here shown for explanatory purposes, except as I may be limited by the hereto appended claims.

I claim:

1. In a folding vehicle for children: a central body member curved upwardly at its rearward end and provided with a handle, said member being jointed whereby the rearward upper portion thereof can be folded forwardly and downwardly, a connecting shaft transversely through the rearward part of said body member, vertical side members pivotally connected on the opposite ends of said shaft, carrying wheels supporting the lower ends of said vertical side members, an upper frame member pivotally connected at its rearward opposite sides to said vertical side members, a vertical link member pivotally connected at its upper end to the front of said upper frame member and at its lower end pivotally connected to said central body member, a seat board having its rearward end supported between said vertical side members, above said central body member, said seat board having a narrow front end slidably connected with said vertical link member, and a connecting link from the upper part of said central body member to the rearward end of said upper frame and said vertical side members, whereby the folding of said handle forwardly folds said vertical side members, upper frame, seat board and vertical link forwardly together in a collapsed condition.

2. A folding vehicle for children including a main central body member having a T-member at its forward end with casters at its opposite ends, said body member curving upwardly at its rearward end, a handle extension member pivotally connected with the end of said body member and foldable forwardly and downwardly, vertical side members pivotally connected together at a space apart and to said body member, with carrier wheels on the lower ends of said side members, a top frame member pivotally connected at its opposite rearward end to said side members, a vertical link pivotally connected at its lower end to said central body member and at its upper end to said top frame member, a seat board suspended from said top frame member between said side members and above said central body member, said seat board being narrow at its forward end and movably supported on said vertical link, a connecting link from the handle extension to the rearward part of said upper frame member, and operable to move said frame member, side members and seat board forwardly and downwardly into collapsed condition as said handle extension is moved forwardly and downwardly in folding operation.

3. A folding vehicle as set forth in claim 2, having a string of beads on a spring wire in the front of said top frame, and the handle extension having a T-handle yieldingly held under said beads when folded.

4. A folding vehicle as set forth in claim 2 in which said vertical side members at their upper ends support a flexible seat back extended from one to the other.

5. In a folding vehicle of the character referred to, a main underlying body member having supporting casters at its forward end and having its rearward end turned upwardly, a handle extension hingedly connected with the rearward end of said body member and foldable forwardly and downwardly from its normal position, two side members pivotally connected through said body member, said side members having carrier wheels at their lower ends below said body member, and being extended vertically and having a seat back extended from one to the other, a top frame pivotally connected at its opposite sides to said side members, a vertical link member pivotally connected at its upper end to the front part of said frame and at its lower end pivotally connected to said main body member, a seat board suspended by fabric back and sides from said top frame member, said seat board having a narrow front end movably supported on said vertical link member, and a connecting and folding link from the handle extension to the rearward part of said top frame, and operable to fold said side members, top frame, seat board and vertical link forwardly and downwardly as said handle extension is folded forwardly for collapsing said vehicle into folded condition.

ARNOLD E. PETERSON.

REFERENCES CITED

The following references are of record in the file of this patent:

UNITED STATES PATENTS

| Number | Name | Date |
|---|---|---|
| 1,040,602 | Adams | Oct. 8, 1912 |
| 1,876,111 | Van Gulpen | Sept. 6, 1932 |
| 1,987,385 | Back | Jan. 8, 1935 |
| 2,305,719 | Lee | Dec. 22, 1942 |
| 2,435,022 | Troendle | Jan. 27, 1948 |
| 2,455,168 | Gilmore | Nov. 30, 1948 |